United States Patent
Muto

(10) Patent No.: US 7,835,686 B2
(45) Date of Patent: Nov. 16, 2010

(54) IMAGE FORMING DEVICE, CONTROL METHOD OF IMAGE FORMING DEVICE, PROGRAM FOR ACHIEVING CONTROL METHOD, AND STORAGE MEDIUM FOR STORING PROGRAM

(75) Inventor: Tsuyoshi Muto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 12/055,759

(22) Filed: Mar. 26, 2008

(65) Prior Publication Data

US 2008/0180710 A1 Jul. 31, 2008

Related U.S. Application Data

(62) Division of application No. 11/573,655, filed as application No. PCT/JP2005/019161 on Oct. 12, 2005, now Pat. No. 7,466,957.

(30) Foreign Application Priority Data

Oct. 13, 2004 (JP) .............................. 2004-299074

(51) Int. Cl.
*G03G 15/00* (2006.01)

(52) U.S. Cl. ...................... 399/401; 399/388; 399/402; 101/35; 101/484; 400/62; 347/106

(58) Field of Classification Search ................... 101/41, 101/42, 43, 36, 35, 484; 399/389, 401, 402, 399/388; 347/106
See application file for complete search history.

(56) References Cited

U.S. PATENT DOCUMENTS

| 5,326,179 A * | 7/1994 | Fukai et al. .................. 400/521 |
| 6,854,000 B2 | 2/2005 | Ikegami et al. |
| 2005/0062984 A1 | 3/2005 | Ikegami et al. |

FOREIGN PATENT DOCUMENTS

| JP | 02-19915 | 1/1990 |
| JP | 2000-337426 | 12/2000 |
| JP | 2003-011939 | 1/2003 |
| JP | 2003-159838 | 6/2003 |
| JP | 2003-288557 | 10/2003 |

* cited by examiner

*Primary Examiner*—Ren Yan
*Assistant Examiner*—Matthew G Marini
(74) *Attorney, Agent, or Firm*—Fitzpatrick, Cella, Harper & Scinto

(57) ABSTRACT

An image forming device comprises: an image forming unit adapted to execute image formation on a recording medium; and a writing unit adapted to be able to execute at least an information writing operation in a non-contact manner to a non-contact IC added to the recording medium. It is controlled whether or not the image forming unit should execute the image formation on the recording medium, according to a result of the information writing operation executed by the writing unit to the non-contact IC added to the recording medium.

5 Claims, 10 Drawing Sheets

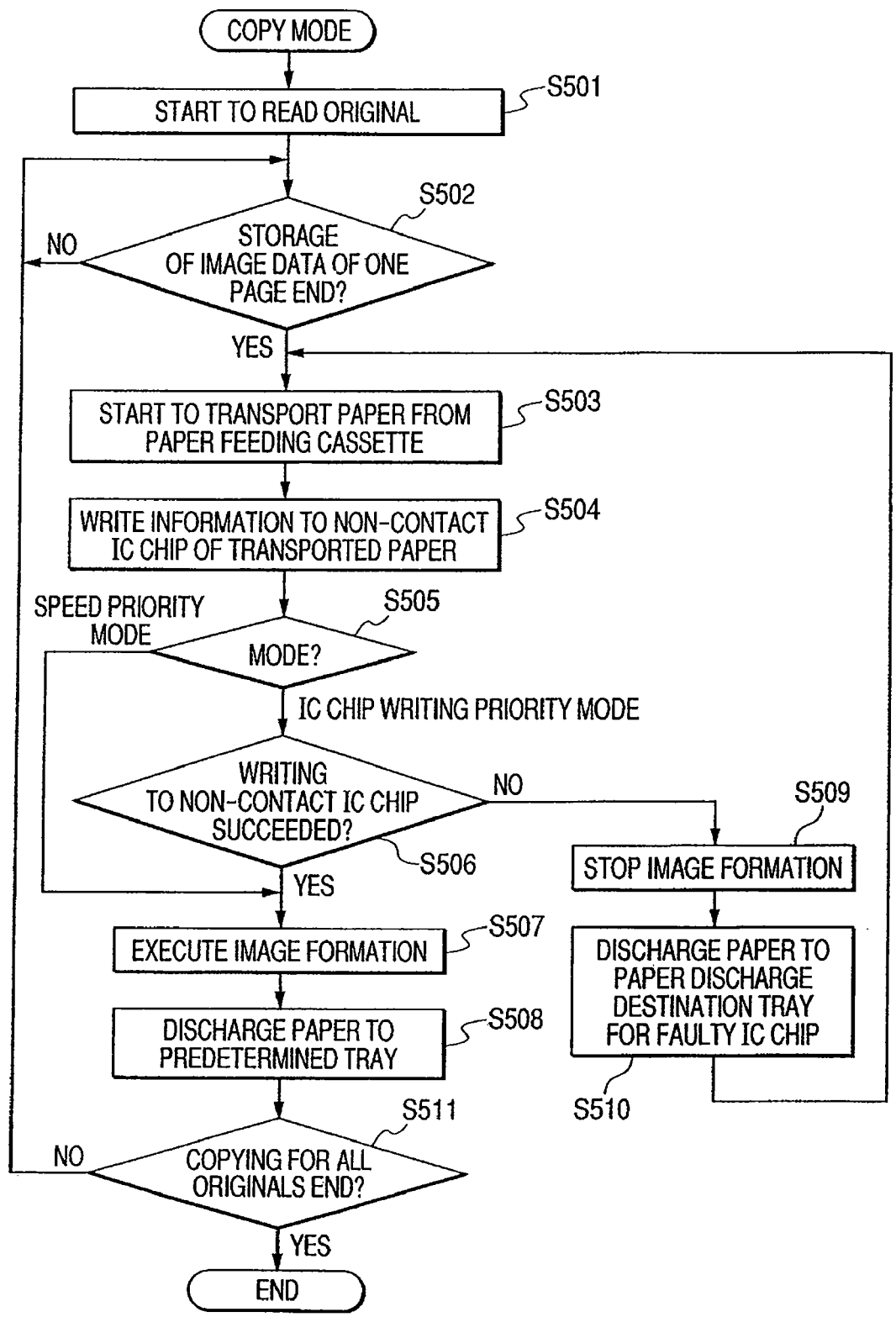

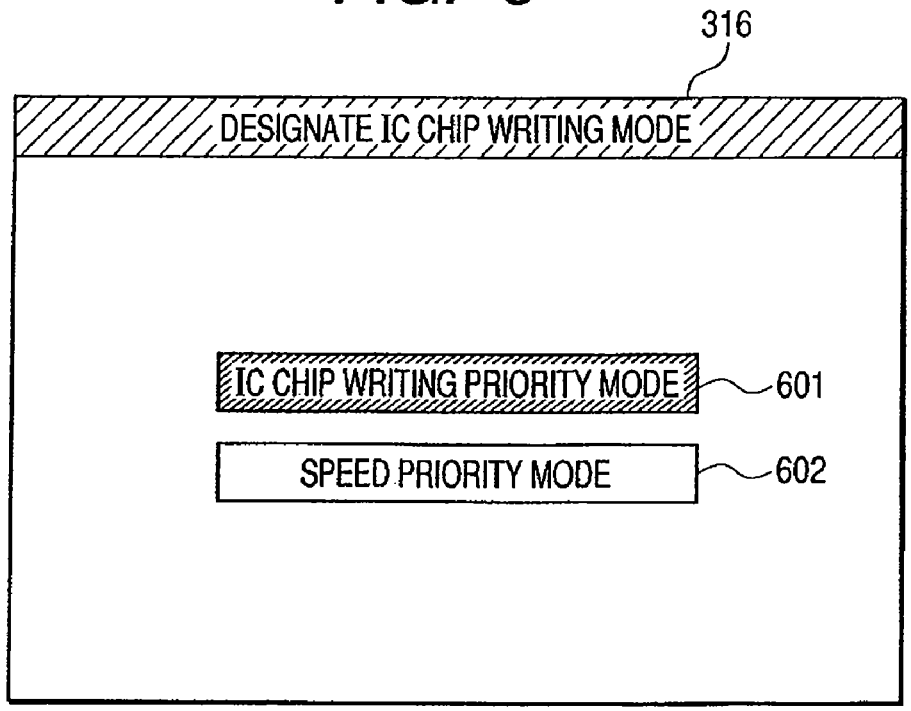
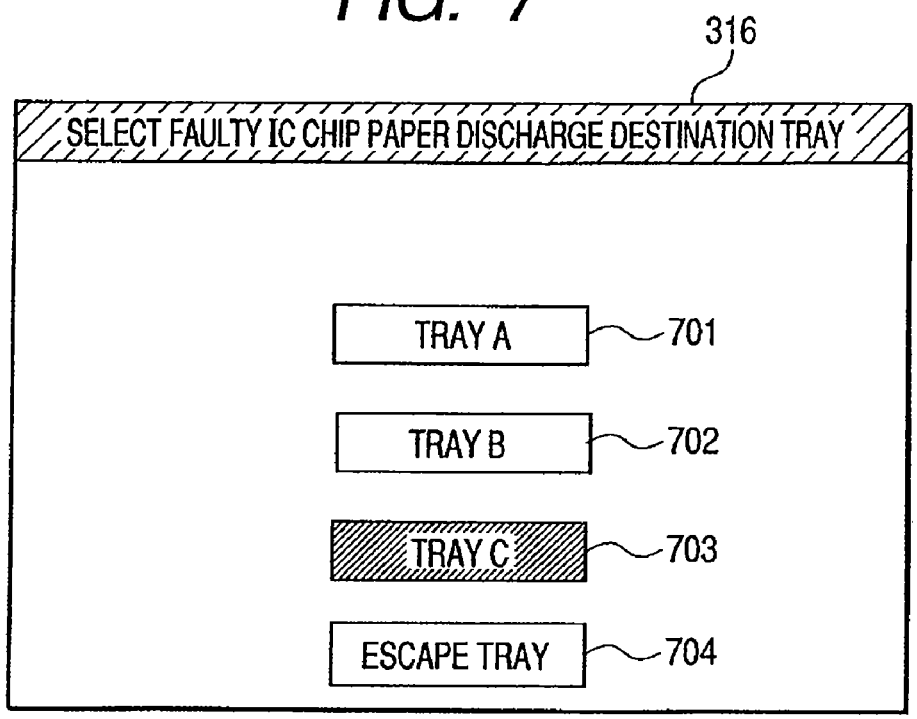

IMAGE FORMING DEVICE, CONTROL METHOD OF IMAGE FORMING DEVICE, PROGRAM FOR ACHIEVING CONTROL METHOD, AND STORAGE MEDIUM FOR STORING PROGRAM

This is a divisional of U.S. patent application Ser. No. 11/573,655, filed Feb. 13, 2007.

TECHNICAL FIELD

The present invention relates to an image forming device for forming an image on a recording medium, a control method of the image forming device, a program for achieving the control program, and a storage medium for storing the program.

BACKGROUND ART

In recent years, the printer which executes printing on a paper with non-contact IC (integrated circuit) chip (that is, the paper on which the non-contact IC chip is embedded) is proposed in, for example, Japanese Patent Application Laid-Open No. 2000-337426. Here, it should be noted that "IC chip" can be also called "IC" simply. More specifically, in a case where the printing on the paper with non-contact IC chip is executed, the printer writes information to a non-contact IC chip which has been embedded on the paper with non-contact IC chip. Besides, the printer executes the printing on the basis of the information held in the non-contact IC chip embedded in the paper with non-contact IC chip. Incidentally, it should be noted that the non-contact IC chip is also called a non-contact IC tag or a non-contact IC and is used in the RFID (Radio Frequency Identification) technology.

In the printer which writes the information to the non-contact IC chip in case of the printing to the paper with non-contact IC chip, if the image data input to the printer includes the information to be written to the non-contact IC chip, the relevant information is written to the non-contact IC chip and also the printing based on the input image data is executed on the paper with non-contact IC chip.

In Japanese Patent Application Laid-Open No. 2000-337426, if the paper with non-contact IC chip to be fed to the printer runs out, the information to be written to the non-contact IC chip on the paper with non-contact IC chip is transformed into a QR (quick response) code, and the acquired QR code as well as the input image data is printed on an ordinary paper (that is, the paper on which there is no non-contact IC chip) instead of the paper with non-contact IC chip.

In addition, the technology that, if the information was not able to be written to the non-contact IC chip on the paper with non-contact IC chip, the previous content is printed on a next paper with non-contact IC chip and also the relevant information is written to the non-contact IC chip on the next paper with non-contact IC chip is proposed in, for example, Japanese Patent Application Laid-Open No. 2003-288557.

As described above, in the case where the QR code is printed on the ordinary paper together with the input image data if the paper with non-contact IC chip runs out, it is possible to compensate a lack of the information by printing the QR code on the ordinary paper. However, in that case, for example, there is a possibility that the paper with non-contact IC chip on which the writing of the information to the non-contact IC chip was failed is output. As a result, the output paper with non-contact IC chip is short of the information to be written to the non-contact IC chip under normal conditions.

Moreover, in a case where the information was not able to be written in the non-contact IC chip on the paper with non-contact IC chip, if the technology of printing the previous content on the next paper with non-contact IC chip and also writing the previous information to the non-contact IC chip on the next paper with non-contact IC chip is used, it is possible to acquire the predetermined number of papers with non-contact IC chip on which the writing of the information to the non-contact IC chip succeeded. However, in that case, the sheaf of the papers with non-contact IC chip mixedly includes the papers with non-contact IC chip on which the writing of the information to the non-contact IC chip succeeded and the papers with non-contact IC chip on which the writing of the information to the non-contact IC chip did not succeed (or the writing of the information to the non-contact IC chip failed). For this reason, the user has to appropriately sort in the relevant sheaf the papers with non-contact IC chip on which the writing of the information to the non-contact IC chip succeeded from the papers with non-contact IC chip on which the writing of the information to the non-contact IC chip failed.

Moreover, it is generally needless or useless to execute the image formation to the papers with non-contact IC chip on which the writing/reading to/from the non-contact IC chip failed. For this reason, it is necessary not to execute such needless image formation.

DISCLOSURE OF THE INVENTION

Accordingly, the present invention is conceived in response to the above disadvantages of the conventional art.

For example, by the image forming device and the control method thereof according to the present invention, it is possible to discriminatingly output a recording medium with non-contact IC chip on which the writing or the reading of information to or from a non-contact IC chip succeeded and a recording medium with non-contact IC chip on which the writing or the reading of information to or from a non-contact IC chip failed.

Moreover, for example, by the image forming device and the control method thereof according to the present invention, it is possible not to execute image formation to the recording medium with non-contact IC chip on which the writing or the reading of the information to or from the non-contact IC chip failed.

An object of the present invention is to provide an image forming device comprising:

an image forming unit adapted to execute image formation on a recording medium;

a writing unit adapted to be able to execute at least an information writing operation in a non-contact manner to a non-contact IC added to the recording medium; and a control unit adapted to control whether or not the image forming unit should execute the image formation on the recording medium, according to a result of the information writing operation executed by the writing unit to the non-contact IC added to the recording medium.

Another object of the present invention is to provide an image forming device comprising:

an image forming unit adapted to execute image formation on a recording medium;

a writing unit adapted to execute an information writing operation in a non-contact manner with respect to a non-contact IC added to the recording medium; and a control unit adapted to control to change the image formation by said image forming unit according to whether or not said writing unit correctly executed the information writing operation with respect to the non-contact IC added to the recording medium.

Still another object of the present invention is to provide an image forming device comprising:

an image forming unit adapted to execute image formation on a recording medium;

a reading unit adapted to execute an information reading operation in a non-contact manner with respect to a non-contact IC added to the recording medium; and a control unit adapted to control to change the image formation by said image forming unit according to whether or not said reading unit correctly executed the information reading operation from the non-contact IC added to the recording medium.

Still another object of the present invention is to provide a control method for an image forming device which comprises a writing unit adapted to execute an information writing operation in a non-contact manner with respect to a recording medium to which a non-contact IC has been added, and executes image formation on the recording medium, said method comprising:

a writing step of causing the writing unit to execute the information writing operation with respect to the non-contact IC added to the recording medium; and a control step of controlling to change the image formation according to whether or not the information writing operation was correctly executed with respect to the non-contact IC in said writing step.

Still another object of the present invention is to provide a control method for an image forming device which comprises a reading unit adapted to execute at least an information reading operation in a non-contact manner with respect to a recording medium to which a non-contact IC has been added, and executes image formation on the recording medium, said method comprising:

a reading step of causing the reading unit to execute the information reading operation from the non-contact IC added to the recording medium; and a control step of controlling to change the image formation according to whether or not the information reading operation was correctly executed from the non-contact IC in said reading step.

Moreover, a computer program which is used to cause a computer to execute the control method of the image forming device and a computer-readable storage medium which stores therein the computer program for causing the computer to execute the control method of the image forming device are provided.

According to the present invention, it is possible to discriminatingly output the recording medium with non-contact IC chip on which the writing or the reading of the information to or from the non-contact IC chip succeeded and the recording medium with non-contact IC chip on which the writing or the reading of the information to or from the non-contact IC chip failed.

Moreover, by not executing the image formation to the recording medium with non-contact IC chip on which the writing or the reading of the information to or from the non-contact IC chip failed, it is possible to prevent from executing the needless or useless image formation.

The above and other objects and characteristics of the present invention will become apparent from the following detailed description taken in conjunction with the accompanying drawings.

BRIEF DESCRIPTION OF THE DRAWINGS

FIG. 5 is a flow chart showing the control procedure of the copy mode in which the IC chip writing mode of a digital copying machine 101 shown in FIG. 1 is designated;

FIG. 6 is a diagram showing an example of the IC chip writing priority mode selection screen to be displayed on a touch panel 316 of the operation unit 102 shown in FIG. 1;

FIG. 7 is a diagram showing an example of the faulty IC chip paper discharge destination tray selection screen to be displayed when the IC chip writing priority mode is selected on the IC chip writing priority mode selection screen shown in FIG. 6;

BEST MODE FOR CARRYING OUT THE INVENTION

Hereinafter, the embodiments of the present invention will be explained with reference to the attached drawings.

First Embodiment

Figure 1:
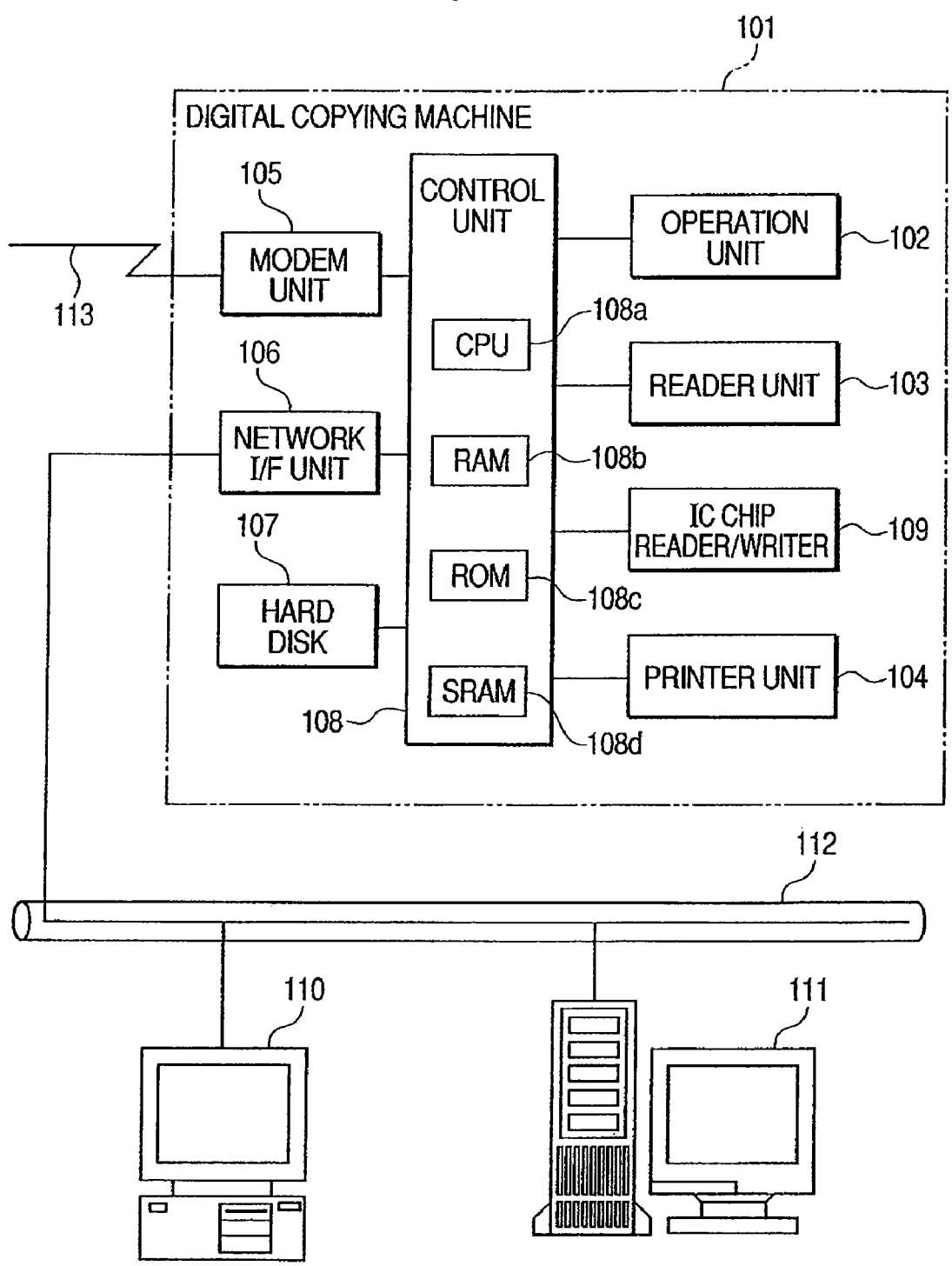
FIG. 1 is a block diagram showing the constitution of the image forming device according to the first embodiment of the present invention.

FIG. 1 is a block diagram showing the constitution of the image forming device according to the first embodiment of the present invention. In the present embodiment, the digital copying machine 101 will be explained as the image forming device.

That is, as shown in FIG. 1, the digital copying machine 101 is equipped with the operation unit 102, the reader unit 103, the printer unit 104, a modem unit 105, a network I/F (interface) unit 106, a hard disk 107, a control unit 108 and an IC chip reader/writer 109.

The operation unit 102 is used to operate and handle the digital copying machine 101, the reader unit 103 reads an original on an original and outputs the thus acquired image data to the control unit 108, and the printer unit 104 prints on a paper the image based on the image data transferred from the control unit 108. Here, it should be noted that, as the paper to which the image is printed, it is possible to use either the paper with non-contact IC chip on which the non-contact IC chip from/to which the information can be read/written has been embedded and the ordinary paper on which the non-contact IC chip is not embedded.

The modem unit 105 expands the facsimile data received through a telephone circuit 113 and transfers the expanded data to the control unit 108. Also, the modem unit 105 compresses the image data transferred from the control unit 108 and transmits the compressed data as the facsimile data through the telephone circuit 113. Here, the facsimile data received by the modem unit 105 can be temporarily stored in the hard disk 107.

The network I/F unit 106 which interfaces with a LAN (local area network) 112 controls the communication with the devices such as a PC (personal computer) 110, a server 111 and the like. Moreover, the network I/F unit 106 outputs the image data transferred from the PC 110 or the server 111 through the LAN 112 to the control unit 108. Besides, the network I/F unit 106 transfers the image data and the control code to the PC 110 or the server 111 in response to the indication issued from the control unit 108.

The hard disk 107 is the storage device which stores the image data. Here, if the order of reading of the image data from the hard disk 107 is changed, it is possible to change the print output order. Moreover, if the plural copies of the same image are output, the same image data is read from the hard disk 107 plural times. Besides, if it takes a long time for the transfer of the data as in the facsimile transmission or the facsimile reception, it is possible to temporarily store in the hard disk 107 the PDL (page description language) extraction data and the image data acquired by the reader unit 103.

The control unit 108 is equipped with a CPU (central processing unit) 108a, a RAM (random access memory) 108b, a ROM (read only memory) 108c and an SRAM (static random access memory) 108d. Here, the CPU 108a totally controls the digital copying machine 101 by executing the programs stored in the ROM 108c. Moreover, the CPU 108a controls the data flows among the reader unit 103, the printer unit 104, the modem unit 105, the network I/F unit 106 and the hard disk 107.

The IC chip reader/writer 109 which is originally provided in the printer unit 104 reads in a non-contact manner the information stored in the non-contact IC chip on the paper with non-contact IC chip, and then transfers the read information to the control unit 108. Also, the IC chip reader/writer 109 can write in a non-contact manner the information transferred from the control unit 108 to the non-contact IC chip on the paper with non-contact IC chip.

Next, the constitutions of the reader unit 103 and the printer unit 104 will be explained with reference to FIG. 2. More specifically, FIG. 2 is the longitudinal sectional view showing the constitutions of the reader unit 103 and the printer unit 104 both shown in FIG. 1.

Figure 2:
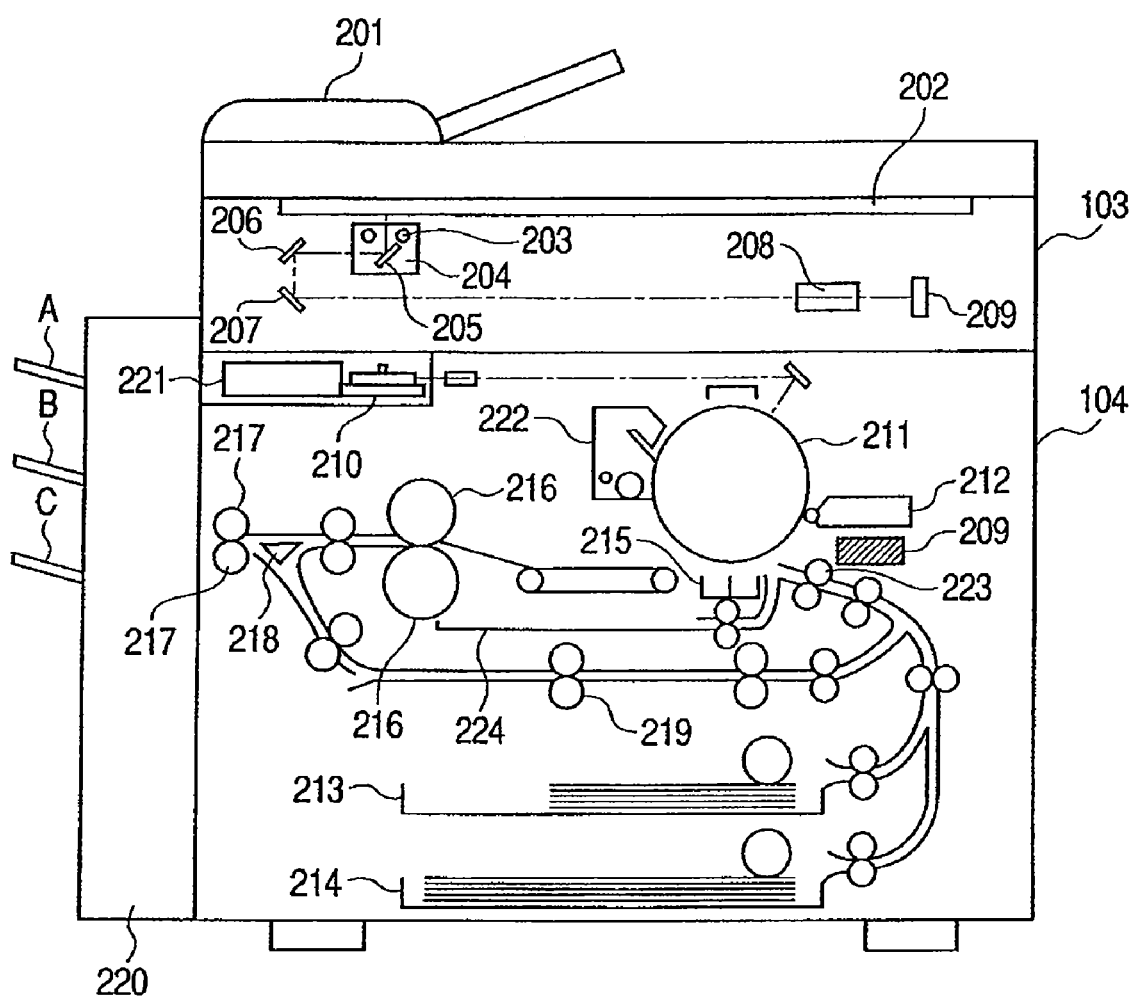
FIG. 2 is a longitudinal sectional view showing the constitutions of a reader unit 103 and a printer unit 104 both shown in FIG. 1.

As shown in FIG. 2, the reader unit 103 and the printer unit 104 are integrally constituted. More specifically, in FIG. 2, a document feeder 201 which is mounted on the reader unit 103 feeds one by one the originals (documents) from the last page thereof onto a platen glass 202. Then, if the reading operation to the fed original put on the platen glass 202 ends, the document feeder 201 discharges the relevant original from the platen glass 202.

In any case, if the original is fed and put on the platen glass 202, a lamp 203 lights, and a scanner unit 204 starts to move, whereby the original is exposed and scanned. At that time, the reflection light acquired from the original is guided to a CCD (charge coupled device) image sensor 209 (simply called CCD 209 hereinafter) by mirrors 205, 206 and 207 and a lens 208.

Subsequently, the image on the thus scanned original is read by the CCD 209, the image data output from the CCD 209 is subjected to the predetermined process, and the processed image data is then transferred to the printer unit 104 or the network I/F unit 106 through the control unit 108.

The printer unit 104 comprises a laser beam generation unit 210 and a laser driver 221. Here, the laser driver 221 drives the laser beam generation unit 210 to generate a laser beam according to the image data output from the reader unit 103. Then, the generated laser beam is irradiated to a photosensitive drum 211, whereby the latent image according to the irradiated laser beam is formed on the photosensitive drum 211. Incidentally, a developing unit 212, a transfer unit 215 and a cleaner 222 are arranged in the vicinity of the photosensitive drum 211. Here, the developing unit 212 supplies the toner to the latent image formed on the photosensitive drum 211 so as to visualize the latent image as the toner image, the transfer unit 215 transfers the toner image on the photosensitive drum 211 to a fed paper, and the cleaner 222 collects the residual toner on the photosensitive drum 211. Moreover, an escape tray 224 to which the paper to which image formation is not yet executed is discharged is provided in the printer unit 104.

Here, it should be noted that the paper with non-contact IC chip (that is, the paper to which the non-contact IC chip has been added or adhered) or the ordinary paper (that is, the paper on which there is no non-contact IC chip) is used as the paper, and the papers are supplied from either one of a paper feeding cassette 213 and a paper feeding cassette 214. In the present embodiment, it is assumed that the papers with non-contact IC chip are fed from each of the paper feeding cassettes 213 and 214, and it is also assumed that "paper" implies "paper with non-contact IC chip" as long as there is no specific note.

The leading edge of the paper fed from the paper feeding cassette 213 or 214 is first bumped against registration rollers 223 and thus stopped. Then, the once-stopped paper is transported to the location between the photosensitive drum 211 and the transfer unit 215 at predetermined timing. Incidentally, an IC chip reader/writer 109 which executes information writing/reading to/from the non-contact IC chip on the paper in a non-contact manner is provided before the registration rollers 223. Here, it should be noted that the IC chip reader/writer 109 is disposed to be able to execute wireless communication with the non-contact IC chip on the paper once stopped at the registration rollers 223, whereby the IC chip reader/writer 109 executes the information writing or reading operation with respect to the non-contact IC chip on the paper at the timing when the paper is once stopped at the registration rollers 223.

Then, the toner image on the photosensitive drum 211 is transferred by the transfer unit 215 to the paper transported to the location between the photosensitive drum 211 and the transfer unit 215, and the paper on which the toner image has been transferred is further transported to a fixing unit 216. Thus, in the fixing unit 216, the toner image on the paper is hot-pressed, whereby the toner image is fixed onto the paper.

Subsequently, the paper passed the fixing unit 216 is transported to a finisher 220 by discharge rollers 217. Here, it should be noted that the finisher 220 sorts the transported papers, executes the sheet (paper) processes such as the stapling of the sorted papers and the like, and then discharges the processed papers to trays A, B and C respectively.

Incidentally, in a case where the double-sided printing is set, after the paper was once transported to the discharge rollers 217, each of the discharge rollers 217 is reversed, whereby the paper is guided to a paper re-feeding transportation path 219 by the operation of a flapper 218.

Moreover, in a case where the multiple printing is set, the paper passed the fixing unit 216 is not transported up to the discharge rollers 217 but is guided to the paper re-feeding transportation path 219 by the operation of the flapper 218.

Then, as well as the above, the paper guided to the paper re-feeding transportation path 219 is once stopped at the registration rollers 223, and the once-stopped paper is then transported to the location between the photosensitive drum 211 and the transfer unit 215.

Subsequently, the operation unit 102 will be explained with reference to FIG. 3. That is, FIG. 3 is the plan view showing the key configuration of the operation unit 102 shown in FIG. 1.

Figure 3:
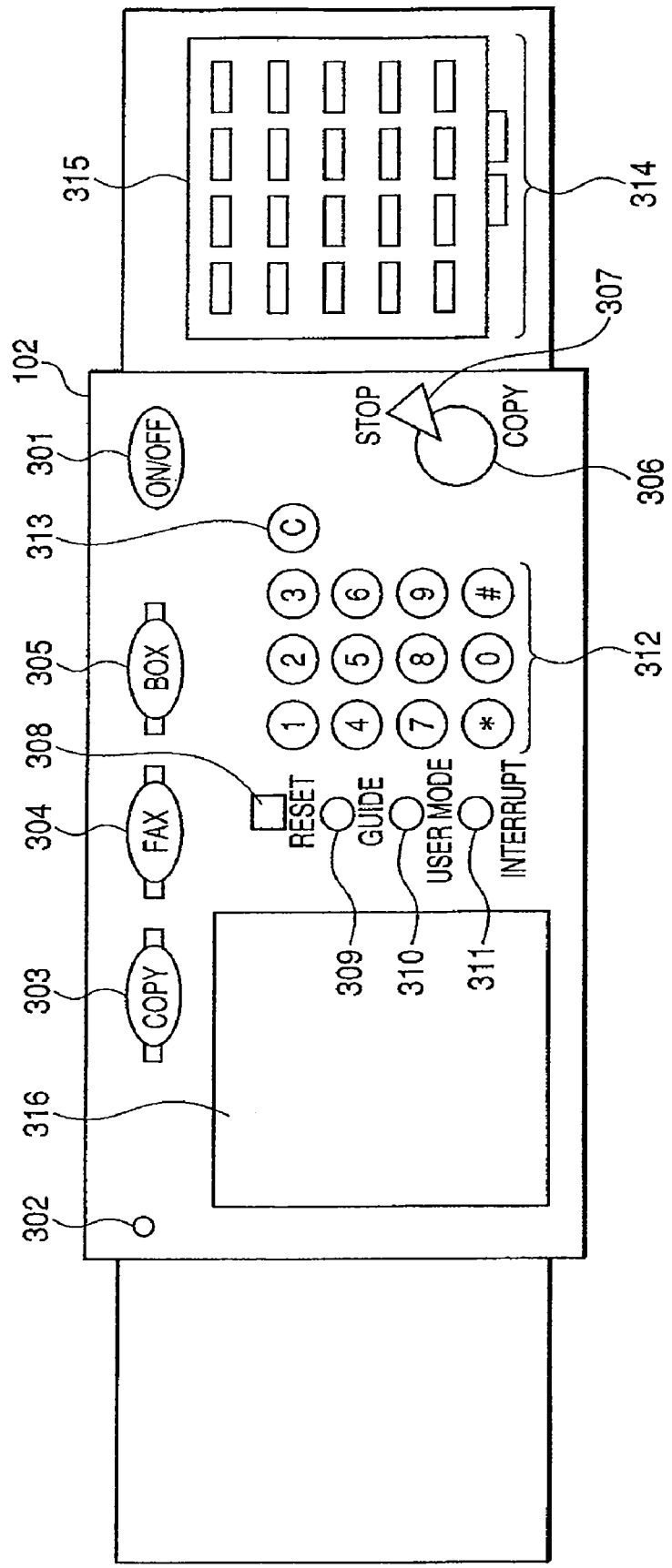
FIG. 3 is a plan view showing the key configuration of an operation unit 102 shown in FIG. 1.

As shown in FIG. 3, a main power source lamp 301, a preheating key 302, a copy mode key 303, a facsimile mode key 304, a box key 305, a copy start key 306, a stop key 307, a reset key 308, a guide key 309, a user mode key 310, an interruption key 311, numerical keys 312, a clear key 313, plural one-touch dialing keys 314, two sets of tabs 315, and a touch panel 316 are provided on the operation unit 102. More specifically, the main power source lamp 301 lights up in the case where the power is being supplied to the main body of the digital copying machine 101, and the preheating key 302 is depressed to turn on and off the preheating mode. Further, the copy mode key 303 is depressed to select the copy mode, the facsimile mode key 304 is depressed to select the facsimile mode, and the box key 305 is depressed to select the box mode. Moreover, the copy start key 306 is depressed to indicate the copy start, and the stop key 307 is depressed to interrupt or stop the copy operation. The user mode key 310 is depressed when the user intends to change the basic setting of the system. Besides, the two sets of tabs 315 function to allocate the operations respectively corresponding to the one-touch dialing keys 314 in accordance with the combinations of the opened and closed states of the tabs, and the touch panel 316 is composed of the combination of the liquid crystal display and the touch sensor. Incidentally, on the touch panel 316, the individual setting screen is displayed with respect to each mode. Moreover, the various software keys for executing various detailed settings are also displayed on the touch panel 316.

Subsequently, the paper with non-contact IC chip will be explained with reference to FIG. 4. That is, FIG. 4 is the plan view showing the constitution of the paper with non-contact IC chip.

Figure 4:
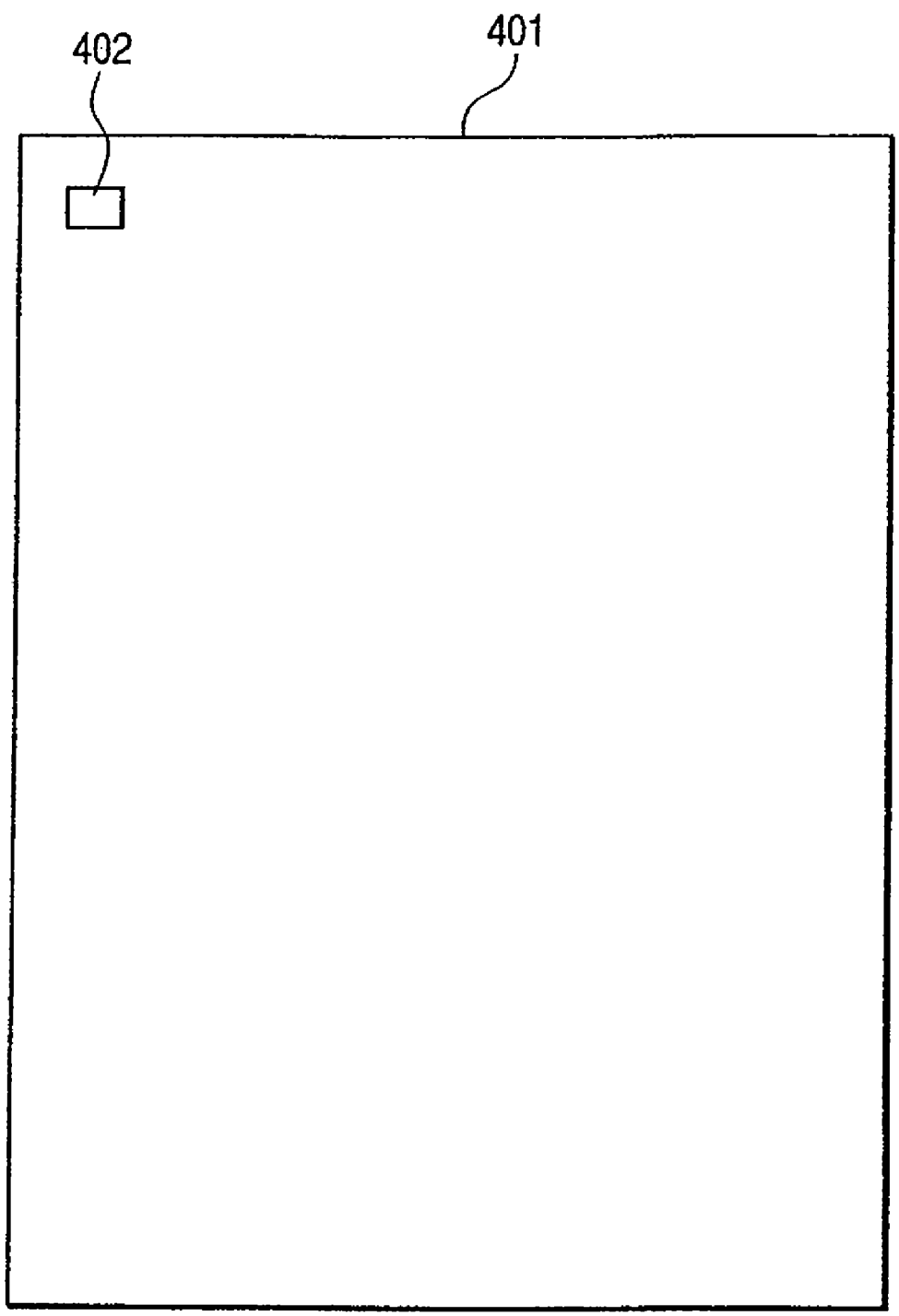
FIG. 4 is a plan view showing the constitution of the paper with non-contact IC chip.

As shown in FIG. 4, the paper with non-contact IC chip is composed of a paper 401 such as a plain paper or the like, and a non-contact IC chip 402 which has been embedded in the paper 401. More specifically, the non-contact IC chip 402 comprises an antenna portion (not shown) and a memory portion (not shown). Thus, when the radio wave (or electric wave) of the predetermined frequency is received from the IC chip reader/writer 109, the antenna portion of the non-contact IC chip 402 produces the induced electromotive force. By using such produced power, the non-contact IC chip 402 transmits/receives the data to/from the IC chip reader/writer 109, and also reads/writes the data from/to the memory portion. Incidentally, it is also possible to use, as the paper with non-contact IC chip, the paper 401 to which the non-contact IC chip 402 has been adhered.

Subsequently, the operation in the copy mode in which the IC chip writing mode of the digital copying machine 101 is designated will be explained with reference to FIGS. 5, 6 and 7. More specifically, FIG. 5 is the flow chart showing the control procedure of the copy mode in which the IC chip writing mode of the digital copying machine 101 shown in FIG. 1 is designated, FIG. 6 is the diagram showing an example of the IC chip writing priority mode selection screen (also called the IC chip writing mode designation screen hereinafter) to be displayed on the touch panel 316 of the operation unit 102 shown in FIG. 1, and FIG. 7 is the diagram showing an example of the faulty IC chip paper discharge destination tray selection screen to be displayed when the IC chip writing priority mode is selected on the IC chip writing priority mode selection screen shown in FIG. 6. Here, it should be noted that the control procedure shown in the flow chart of FIG. 5 is executed by the CPU 108a of the control unit 108.

In the copy mode, the digital copying machine 101 according to the present embodiment can designate the IC chip writing mode. More specifically, if the IC chip writing mode is designated, the information is written to the non-contact IC chip on the fed paper by the IC chip reader/writer 109, and, after then, either the IC chip writing priority mode or the speed priority mode is executed according to the setting by the user.

In the case where the IC chip writing priority mode is being set, the image formation is controlled according to whether or not the information writing to the non-contact IC chip succeeded. More specifically, if the information writing to the non-contact IC chip succeeded, the image is formed on the fed paper, and the paper on which the image has been formed is transported to the designated paper discharge tray. On the contrary, if the information writing to the non-contact IC chip did not succeed, any image is not formed on the fed paper, and the paper on which the image is not formed is transported to the discharge destination tray different from the paper discharge tray with respect to which the information writing to the non-contact IC chip succeeded is discharged.

In the meanwhile, in the case where the speed priority mode is being set, the image is formed on the fed paper irrespective of whether or not the information writing to the non-contact IC chip succeeded. Then, the paper on which the image has been formed is discharged to the designated paper discharge tray.

Incidentally, if the IC chip writing mode is designated, the paper with non-contact IC chip is used as the paper under normal conditions. However, for example, if the non-contact IC chip which has been embedded in (or adhered to) the paper is faulty or defective, if the non-contact IC chip is damaged while the paper is transported up to the registration rollers 223, or the like, the information writing to the non-contact IC chip did not succeed. For this reason, the fed paper on which the image is not formed is discharged. Moreover, if the ordinary paper (that is, the paper on which there is no non-contact IC chip) is erroneously fed, the information writing to the non-contact IC chip did not succeed with respect to the ordinary paper. Thus, also in that case, the fed ordinary paper on which the image is not formed is discharged.

On the other hand, if the IC chip writing mode is not designated, the normal copy mode is executed. In the normal copy mode, the image formation is executed to the fed paper irrespective of whether the fed paper is the paper with non-contact IC chip or the ordinary paper (that is, the paper on which there is no non-contact IC chip), whereby the information writing to the non-contact IC chip is not executed to the paper. In any case, since the operation in the normal copy mode is well known, the explanation thereof will be omitted.

In the case where the IC chip writing mode is designated by the user through the operation unit 102, for example, the IC chip writing mode designation screen as shown in FIG. 6 is displayed on the touch panel 316. More specifically, on the IC chip writing mode designation screen, a button 601 which is depressed to select and designate the IC chip writing priority mode and a button 602 which is depressed to select and designate the speed priority mode are displayed. Here, it should be noted that such mode selection by the buttons 601 and 602 is executed exclusively. More specifically, the IC chip writing priority mode is selected and set if the button 601 is depressed, while the speed priority mode is selected and set if the button 602 is depressed. Then, the set mode is stored in the SRAM 108d of the control unit 108.

If the IC chip writing priority mode is selected on the IC chip writing mode designation screen, for example, the faulty IC chip paper discharge destination tray selection screen as shown in FIG. 7 is displayed on the touch panel 316. Here, it should be noted that the faulty IC chip paper discharge destination tray selection screen is the screen which is used to select the tray (also called the faulty IC chip paper discharge destination tray) to which the paper on which the information writing to the non-contact IC chip did not succeed should be discharged. On the faulty IC chip paper discharge destination tray selection screen, plural buttons 701, 702, 703 and 704 which are used to respectively designate the faulty IC chip paper discharge destination trays are displayed. For example, if the button 703 is depressed, the tray C is selected and set as the faulty IC chip paper discharge destination tray, and the set tray C is stored in the SRAM 108d as the selected faulty IC chip paper discharge destination tray. Here, it should be noted that it is impossible to set the faulty IC chip paper discharge destination tray shown in FIG. 7 to be the same as the paper discharge destination used in the copy job.

In any case, the user designates the IC chip writing mode, executes the various settings necessary in the copy mode, sets the originals to the document feeder 201, and then depresses the copy start key 306. Thus, the operation in the copy mode starts.

In the copy mode, as shown in FIG. 5, it is controlled by the control unit 108 to start to read the original (step S501). Then, if the reading of the original starts, the set originals are sequentially fed one by one from the document feeder 201 onto the platen glass 202, and the image on the fed original is read by the reader unit 103. The image data is then stored in the hard disk 107 in due order every time the original is read.

Subsequently, the control unit 108 waits for until the image data of one page to be next output is stored in the hard disk 107 (step S502). At first, the image data of the first page is stored. Then, if the image data of the one page to be next output is stored in the hard disk 107, the image data is output from the hard disk 107 to the printer unit 104 through the control unit 108. In the printer unit 104, the latent image based on the relevant image data is formed on the photosensitive drum 211, and the formed latent image is visualized as the toner image through the developing process.

Moreover, if the image data of the one page to be next output is stored in the hard disk 107, it is controlled by the control unit 108 to feed the paper from either the paper feeding cassette 213 or 214 and start to transport the fed paper (step S503). The paper fed from either the paper feeding cassette 213 or 214 is transported toward the registration rollers 223, and the transported paper is once stopped in the state that the leading edge of the paper is bumped against registration rollers 223. Then, the control unit 108 controls the IC chip reader/writer 109 to write the information concerning the contents (e.g., magnification, layout, original size, paper size, paper type, number of colors, etc.) set by the user to the non-contact IC chip on the paper stopped at the registration rollers 223 (step S504).

Subsequently, the control unit 108 refers to the information in the SRAM 108d and thus judges whether the mode set through the IC chip writing mode designation screen as shown in FIG. 6 is the IC chip writing priority mode or the speed priority mode (step S505). Then, if the IC chip writing priority mode is set, the control unit 108 controls the IC chip reader/writer 109 to read the information from the non-contact IC chip on the paper. Further, the control unit 108 judges whether or not the information writing to the non-contact IC chip succeeded, according to whether or not the read information conforms to the information indicated to be written to the non-contact IC chip in the step S504 (step S506). Here, if the read information conforms to the information indicated to be written to the non-contact IC chip, the control unit 108 judges that the information writing to the non-contact IC chip succeeded. On the contrary, if the read information does not conform to the information indicated to be written to the non-contact IC chip, the control unit 108 judges that the information writing to the non-contact IC chip did not succeed.

If it is judged that the information writing to the non-contact IC chip succeeded, the control unit 108 controls to execute the image formation (step S507). In the control of the image formation, the control unit 108 respectively controls the operation that the paper is transported to the location between the photosensitive drum 211 and the transfer unit 215 by the registration rollers 223, the operation that the toner image on the photosensitive drum 211 is transferred onto the paper by the transfer unit 215, and the operation that the toner image transferred onto the paper is fixed thereto by the fixing unit 216. Here, the formation of the latent image to the photosensitive drum 211 based on the image data, the development of the formed latent image, and the like were already started in the predetermined timing after the time when the storage of the image data to be output in the hard disk 107 ends in the step S502, so as to be in time for the start timing of the process in the step S507. Then, the control unit 108 discharges the paper to the designated tray (for example, the uppermost tray A in the finisher 220 shown in FIG. 2) (step S508).

Subsequently, the control unit 108 judges whether or not the copying of all the originals from the document feeder 201 ends (step S511). If the copying of all the originals does not end, the flow returns to the step S502. On the contrary, if the copying of all the originals ends, the process in the copy mode ends.

Incidentally, if it is judged in the step S506 that the information writing to the non-contact IC chip failed, the control unit 108 stops the image formation (step S509). Here, the toner image (that is, the toner itself) formed on the photosensitive drum 211 is collected by the cleaner 222, and the paper is then transported to the location between the photosensitive drum 211 and the transfer unit 215 by the registration rollers 223. Thus, any toner image is not transferred to the paper, and the relevant paper is transported to the finisher through the fixing unit 216. Then, the control unit 108 controls the finisher 220 so as to discharge the paper to the tray (for example, the lowermost tray C in the finisher 220 shown in FIG. 2) designated as the faulty IC chip paper discharge destination tray by using the faulty IC chip paper discharge destination tray selection screen shown in FIG. 7 (step S510). Here, it should be noted that the paper on which the information writing to the non-contact IC chip failed might include the ordinary paper.

Subsequently, the flow returns to the step S503 to feed a new paper. Then, the control unit 108 controls to repeat the processes in the step S503, S506, S509 and S510 until the information writing to the non-contact IC chip on the newly fed paper succeeds. That is, the formation of the same toner image to the photosensitive drum 211 and the collection of the toner of the toner image are repeated until the information writing to the non-contact IC chip on the newly fed paper succeeds.

As described above, according to the present embodiment, the papers on which the writing of the information to the non-contact IC chip succeeded and the papers on which the writing of the information to the non-contact IC chip failed are independently output respectively to the corresponding trays, whereby the user can easily acquire only the papers on which the writing of the information to the non-contact IC chip succeeded without sorting the output papers. As a result, the convenience to the user improves.

Incidentally, in the present embodiment, to avoid that the image is unnecessarily formed on the paper, both the writing of the information to the non-contact IC chip 402 and the confirmation of the written information are executed before the image formation is executed. However, it is also possible to execute the writing of the information to the non-contact IC chip and the confirmation of the written information after the image formation on the paper. Besides, it is further possible to execute the writing of the information to the non-contact IC chip before the image formation on the paper and execute the confirmation of the written information after the image formation on the paper. In that case, a further IC chip reader/writer is added and provided at an appropriate location on the paper transportation path between the transfer unit 215 and the discharge rollers 217 of the image forming device (that is, the downstream side of the IC chip reader/writer 109 on the paper transportation path), the information writing is executed by the IC chip reader/writer 109, and the information reading is executed by the further added IC chip reader/writer.

Moreover, in the present embodiment, the faulty IC chip paper discharge destination tray is selected by using the faulty IC chip paper discharge destination tray selection screen. However, the control unit 108 may automatically select the free (vacant) tray as the faulty IC chip paper discharge destination tray. In that case, it is possible to prevent that the paper on which the writing of the information to the non-contact IC chip failed mixes with the papers output in another job or the like.

In addition, the escape tray 224 may be selected as the faulty IC chip paper discharge destination tray. In the case where the escape tray 224 is selected, the paper on which the writing of the information to the non-contact IC chip failed is transported to the escape tray 224 by controlling a not-shown flapper provided between the registration roller and the transfer unit. Thus, it is possible to discharge the paper without passing it through the fixing unit, whereby the transported paper is not damaged. Consequently, the paper discharged to the escape tray can be again used for, for example, the image formation in which the IC chip writing mode is not designated, as maintaining the same degree of quality as unused.

Second Embodiment

Figure 8:
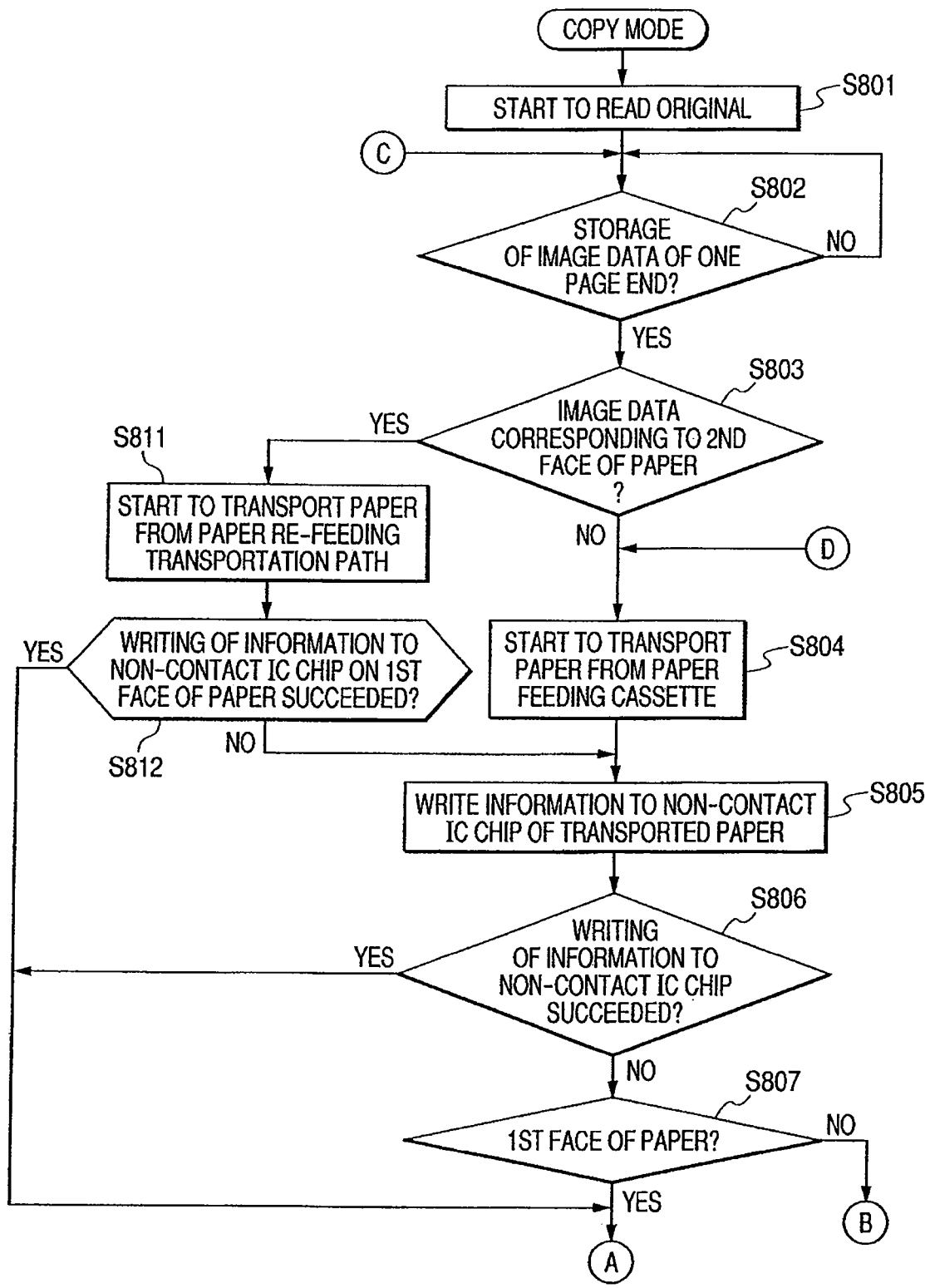
FIG. 8 is a flow chart showing the control procedure of the double-sided copy mode in which the IC chip writing mode in the image forming device according to the second embodiment of the present invention is designated.
Figure 9:
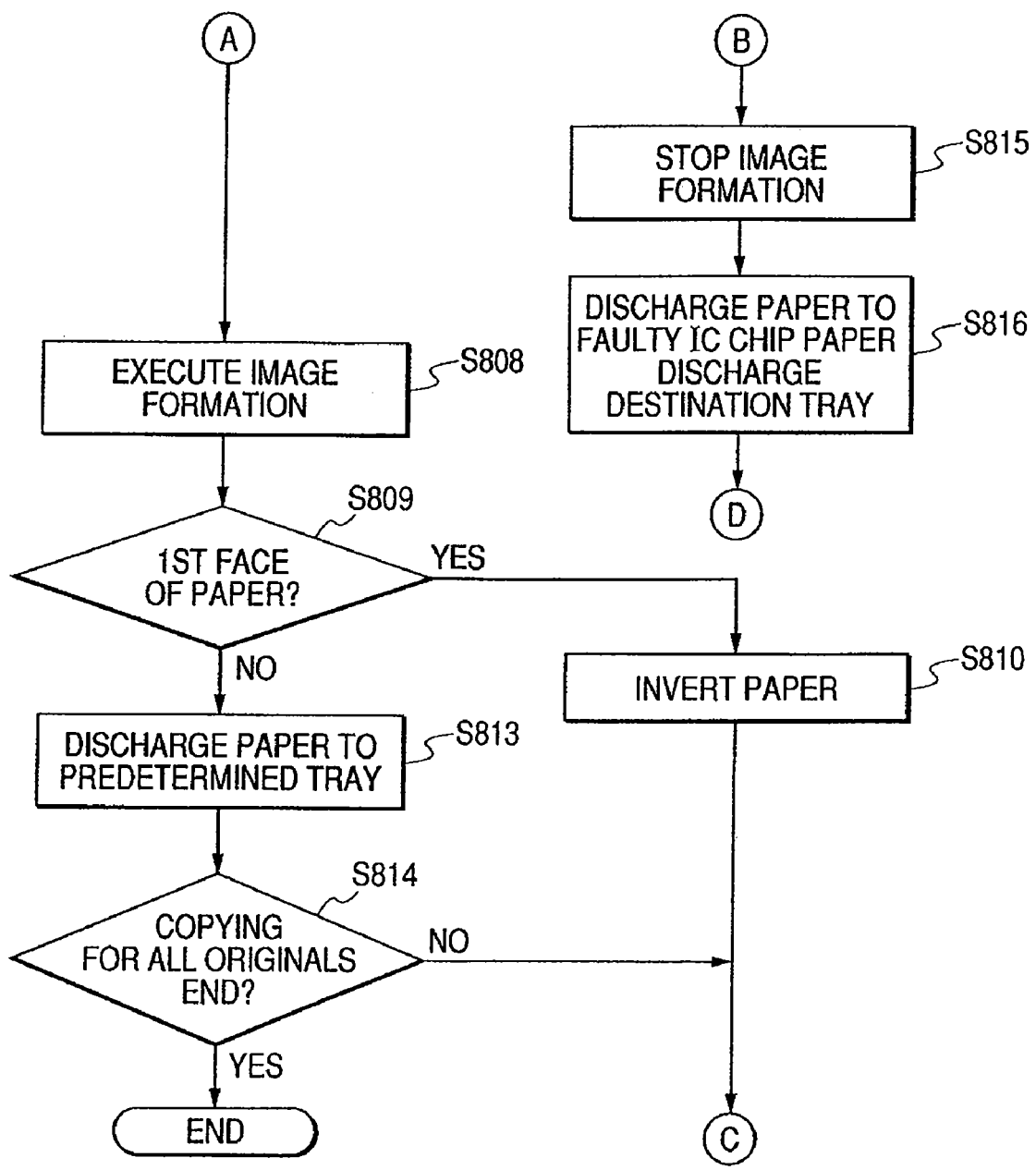
FIG. 9 is a flow chart showing the control procedure of the double-sided copy mode in which the IC chip writing mode in the image forming device according to the second embodiment of the present invention is designated.

Subsequently, the second embodiment of the present invention will be explained with reference to FIGS. 8 and 9. FIGS. 8 and 9 are the flow charts showing the control procedure of the double-sided copy mode in which the IC chip writing mode in the image forming device according to the second embodiment of the present invention is designated.

In the above first embodiment, the control to be executed in the information writing to the non-contact IC chip on the paper in the single-sided copy mode is explained. Meanwhile, in the present embodiment, the control to be executed in the information writing to the non-contact IC chip on the paper in the double-sided copy mode will be explained. Here, it should be noted that the configuration described in the present embodiment is the same as that described in the first embodiment, whereby the explanation thereof will be omitted.

In the double-sided copy mode according to the present embodiment, unlike the first embodiment, it is impossible to select either one of the IC chip writing priority mode and the speed priority mode, that is, the IC chip writing priority mode is automatically set.

In the double-sided copy mode according to the present embodiment, as shown in FIG. 8, it is controlled by the control unit 108 to start to read the original (step S801). Then, the control unit 108 waits for until the image data of one page to be next output is stored in the hard disk 107 (step S802). If the image data of the one page to be next output is stored in the hard disk 107, it is judged by the control unit 108 whether or not the image data is the image data corresponding to the second face of the paper (step S803). If it is judged that the image data is not the image data corresponding to the second face of the paper, it is controlled by the control unit 108 to feed the paper from either the paper feeding cassette 213 or 214 and start to transport the fed paper (step S804). The paper fed from either the paper feeding cassette 213 or 214 is transported and once stopped at the registration rollers 223. Then, the control unit 108 controls the IC chip reader/writer 109 to write the designated information to the non-contact IC chip on the paper stopped at the registration rollers 223 (step S805).

Subsequently, the control unit 108 controls the IC chip reader/writer 109 to read the information from the non-contact IC chip on the paper. Further, the control unit 108 judges whether or not the information writing to the non-contact IC chip succeeded, according to whether or not the read information conforms to the information indicated to be written to the non-contact IC chip in the step S805 (step S806). Here, if it is judged that the information writing to the non-contact IC chip did not succeed, the control unit 108 further judges whether or not to execute the image formation on the first face of the paper (step S807). In that case, the image formation is executed to the first face of the paper, the control unit 108 controls to execute the image formation (step S808). On the contrary, if it is judged that the information writing to the non-contact IC chip succeeded, as well as above, the control unit 108 controls to execute the image formation (step S808). That is, in the case where the image formation on the first face of the paper is executed, the image formation is executed irrespective of whether the information writing to the non-contact IC chip succeeded or failed.

In the above image formation, the operation of transporting the paper to the location between the photosensitive drum 211 and the transfer unit 215 by the registration rollers 223, the operation of transferring the toner image on the photosensitive drum 211 onto the paper by the transfer unit 215, and the operation of fixing the transferred toner image onto the paper by the fixing unit 216 are executed.

Subsequently, the control unit 108 judges whether or not the above image formation is the image formation on the first face of the paper (step S809). If it is judged that the above image formation is the image formation on the first face of the paper, the control unit 108 controls to guide the paper to the paper re-feeding transportation path 219 and invert the image formation face of the guided paper (step S810). Then, the flow returns to the step S802 to execute the same procedure as that for the image formation on the first face of the paper so as to execute the image formation on the second face of the paper. Here, since it is judged that the image data to be next output is the image data formed on the second face of the paper (step S803), the control unit 108 controls to start to transport the paper on the paper re-feeding transportation path 219 (step S811). That is, the paper is transported from the paper re-feeding transportation path 219 to the registration rollers 223, and the transported paper is once stopped at the registration rollers 223.

Next, the control unit 108 judges whether or not the information writing to the non-contact IC chip succeeded at the time of the image formation to the first face of the paper (step S812). If it is judged that the information writing to the non-contact IC chip succeeded at the time of the image formation to the first face of the paper, the control unit 108 controls to feed the paper from the registration rollers 223 and execute the image formation (that is, the transfer of the toner image) to the second face of the fed paper (step S808). Then, the control unit 108 judges that the above image formation is not the image formation on the first face of the paper, that is, the control unit 108 judges that the above image formation is the image formation on the second face of the paper (step S809). Subsequently, the control unit 108 controls to discharge the paper of which both the faces have been subjected to the image formation to the designated tray (for example, the uppermost tray A in the finisher 220 shown in FIG. 2) (step S813).

Next, the control unit 108 judges whether or not the double-sided copying of all the originals from the document feeder 201 ends (step S814). If the double-sided copying of all the originals does not end, the flow returns to the step S802. On the contrary, if the double-sided copying of all the originals ends, the process in the copy mode ends.

Meanwhile, if it is judged in the step S812 that the information writing to the non-contact IC chip did not succeed at the time of the image formation to the first face of the paper, the control unit 108 controls the IC chip reader/writer 109 to write the information to the non-contact IC chip on the paper transported from the paper re-feeding transportation path 219 (step S805). Then, if it is judged that the information writing to the non-contact IC chip on the paper transported from the paper re-feeding transportation path 219 succeeded (step S807), the control unit 108 controls to execute the image formation on the second face of the paper (step S808). Moreover, the control unit 108 controls to discharge the paper of which both the faces have been subjected to the image formation to the designated tray (for example, the uppermost tray A in the finisher 220 shown in FIG. 2) (step S813).

Incidentally, if it is judged in the step S807 that the information writing to the non-contact IC chip on the paper transported from the paper refeeding transportation path 219 failed, the control unit 108 stops the image formation on the second face of the paper as shown in FIG. 9 (step S815). Here, the toner image (that is, the toner itself) formed on the photosensitive drum 211 is collected by the cleaner 222, and the paper is then transported to the location between the photosensitive drum 211 and the transfer unit 215 by the registration rollers 223. Thus, any toner image is not transferred to the paper, and the relevant paper is transported to the finisher 220 through the fixing unit 216. Then, the control unit 108 controls the finisher 220 so as to discharge the paper to the tray (for example, the lowermost tray C in the finisher 220 shown in FIG. 2) designated as the faulty IC chip paper discharge destination tray by using the faulty IC chip paper discharge destination tray selection screen shown in FIG. 7 (step S816).

Here, it should be noted that the paper on which the information writing to the non-contact IC chip failed might include the ordinary paper.

Subsequently, the flow returns to the step S804 to feed a new paper. Then, the control unit 108 controls to again start the image formation from the first face of the paper. This is repeated until the information writing to the non-contact IC chip on the paper succeeds.

As described above, according to the present embodiment, in the case where the double-sided copying is executed, with respect to the paper on which the information writing to the non-contact IC chip failed at the time of the copying on the first face thereof (including the paper from which the non-contact IC chip cannot be detected), the information writing to the non-contact IC chip is executed at the time of the copying on the second face thereof. Therefore, it is possible to reduce the occurrence of the papers on which the information writing to the non-contact IC chip failed, and it is also possible to improve the throughput of the double-sided copying.

Third Embodiment

Figure 10:
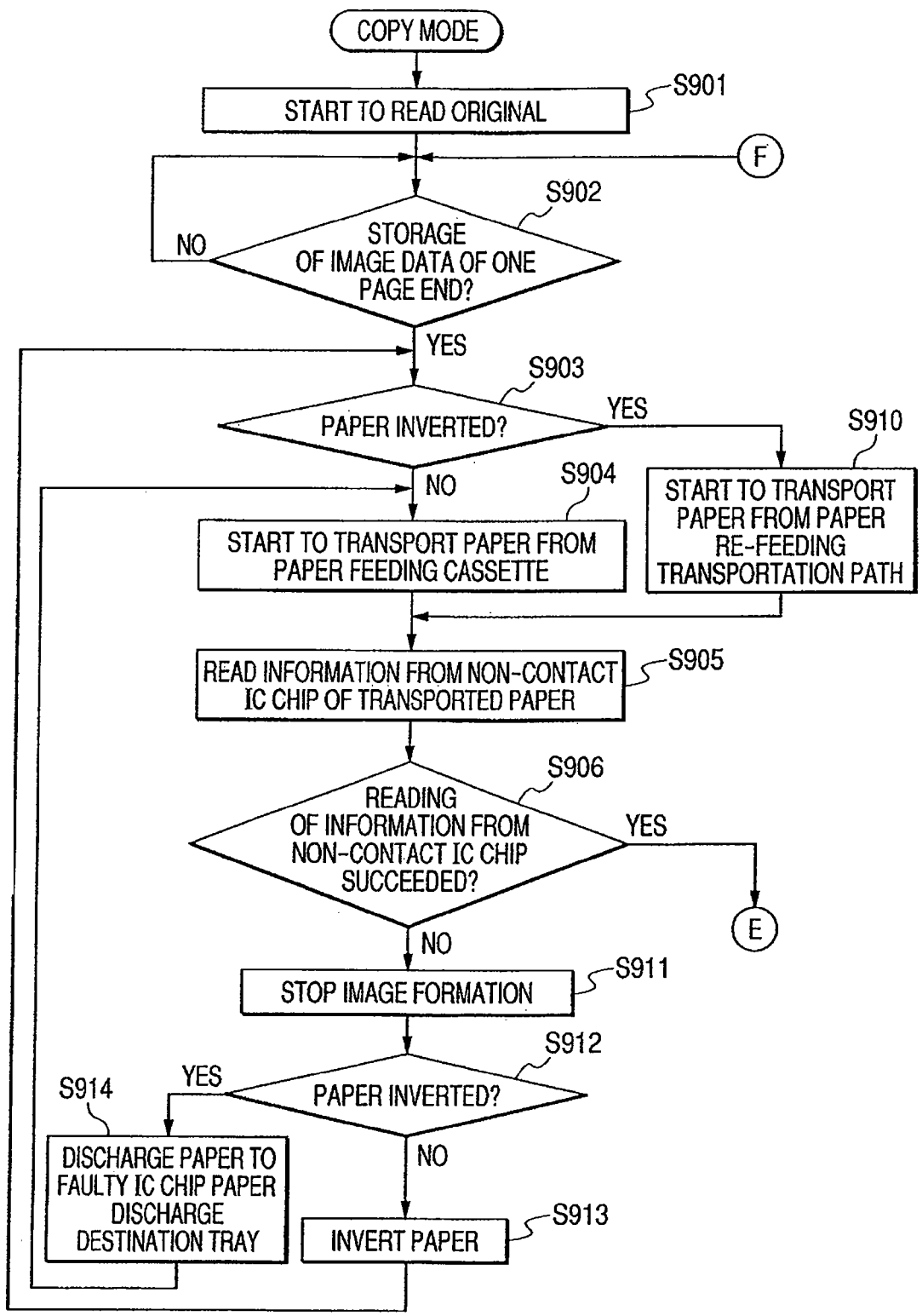
FIG. 10 is a flow chart showing the control procedure of the copy mode in which the IC chip reading mode in the image forming device according to the third embodiment of the present invention is designated.
Figure 11:
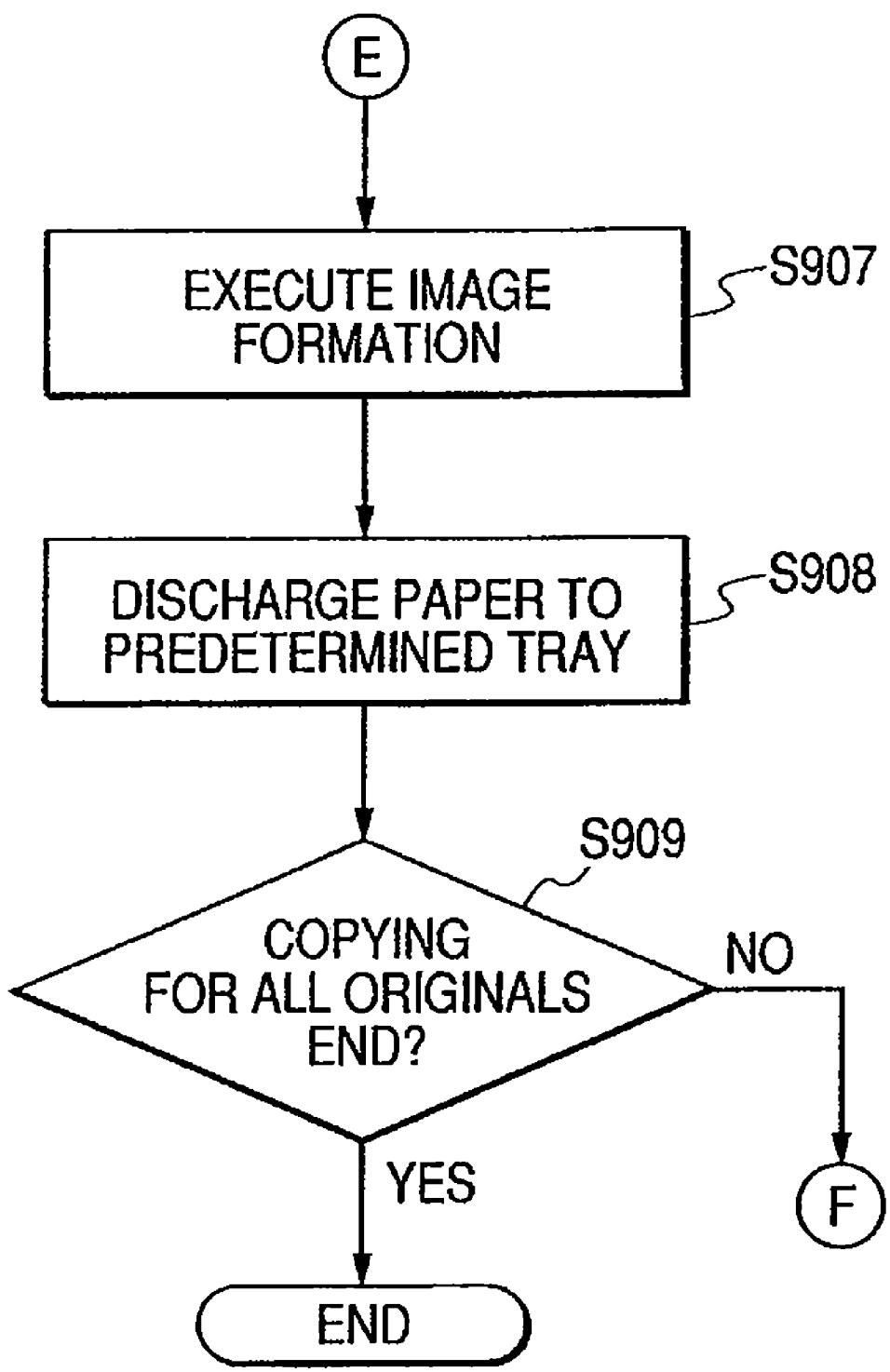
FIG. 11 is a flow chart showing the control procedure of the copy mode in which the IC chip reading mode in the image forming device according to the third embodiment of the present invention is designated.

Subsequently, the third embodiment of the present invention will be explained with reference to FIGS. 10 and 11. FIGS. 10 and 11 are the flow charts showing the control procedure of the copy mode in which the IC chip reading mode in the image forming device according to the third embodiment of the present invention is designated.

In the above first and second embodiments, the information writing to the non-contact IC chip is executed with respect to the paper, and, based on the result of the information writing, the image formation is executed with respect to the paper (that is, the paper with non-contact IC chip) in which the normal non-contact IC chip has been embedded. Meanwhile, in the present embodiment, the information has been previously stored in the non-contact IC chip embedded in the paper, and the relevant paper is held or set in the paper feeding cassette 213 or 214. Then, the information is read from the non-contact IC chip with respect to the paper fed from the paper feeding cassette 213 or 214, and, based on the result of the information reading, the image formation is executed with respect to the paper (that is, the paper with non-contact IC chip) in which the normal non-contact IC chip has been embedded. Here, it should be noted that the configuration described in the present embodiment is the same as that described in the first embodiment, whereby the explanation thereof will be omitted.

In the present embodiment, in the case where the copying is executed, the user first designates the IC chip reading mode and executes various settings in the copy mode. After then, the user actually sets the original to the document feeder 201 and depresses the copy start key 306, whereby the operation in the copy mode starts.

In the copy mode, as shown in FIG. 10, it is first controlled by the control unit 108 to start to read the original (step S901). Then, the control unit 108 waits for until the image data of one page to be next output is stored in the hard disk 107 (step S902). If the image data of the one page to be next output is stored in the hard disk 107, the control unit 108 judges whether or not the paper has been already inverted (step S903). If it is judged that the paper is not inverted yet, it is controlled by the control unit 108 to feed the paper from either the paper feeding cassette 213 or 214 and start to transport the fed paper (step S904). The paper fed from either the paper feeding cassette 213 or 214 is transported up to the registration rollers 223, and the transported paper is once stopped in the state that the leading edge of the paper is bumped against registration rollers 223. Then, the control unit 108 controls the IC chip reader/writer 109 to read the information from the non-contact IC chip on the paper stopped at the registration rollers 223 (step S905).

Next, the control unit 108 judges whether or not the information reading from the non-contact IC chip succeeded in the step S905 (step S906). If it is judged that the information reading from the non-contact IC chip succeeded, the control unit 108 judges that the fed paper is the normal paper with non-contact IC chip, and thus controls to execute the image formation on the relevant paper (step S907). In the control of the image formation, the operation of transporting the paper to the location between the photosensitive drum 211 and the transfer unit 215 by the registration rollers 223, the operation of transferring the toner image on the photosensitive drum 211 onto the paper by the transfer unit 215, the operation of fixing the transferred toner image onto the paper by the fixing unit 216, and the operation of transporting the paper subjected to the fixing to the finisher 220 are respectively controlled. Then, the control unit 108 controls the finisher 220 to discharge the paper to the predetermined tray (for example, the uppermost tray A in the finisher 220) (step S908).

Subsequently, the control unit 108 judges whether or not the copying of all the originals fed from the document feeder 201 ends (step S909). If the copying of all the originals does not end, the flow returns to the step S902. On the contrary, if the copying of all the originals ends, the process in the copy mode ends.

Meanwhile, if it is judged in the step S906 that the information reading from the non-contact IC chip did not succeed, that is, if it is judged that the information reading failed, the control unit 108 stops the image formation on the paper (step S911). Here, the toner image (that is, the toner itself) formed on the photosensitive drum 211 is collected by the cleaner 222, and the paper is then transported to the location between the photosensitive drum 211 and the transfer unit 215 by the registration rollers 223. Thus, the paper passes the fixing unit 216 in the state that any toner image is not transferred to the relevant paper. Then, the control unit 108 judges whether or not the paper has been already inverted (step S912). If it is judged that the paper is not inverted yet, it is controlled by the control unit 108 to guide the paper passed the fixing unit 216 to the paper re-feeding transportation path 219 so as to invert it (step S913).

Subsequently, the flow returns to the step S903, and the control unit 108 judges whether or not the paper has been already inverted. In that case, since the paper has been already inverted, it is controlled by the control unit 108 to start to transport the paper guided to the paper re-feeding transportation path 219 (step S910). Thus, the paper guided to the paper re-feeding transportation path 219 is transported toward the registration rollers 223, and the transported paper is once stopped at the location of the registration rollers 223. Then, the control unit 108 controls the IC chip reader/writer 109 to again read the information from the non-contact IC chip on the paper (step S905). Subsequently, the control unit 108 judges whether or not the information reading from the non-contact IC chip succeeded (step S906). If it is judged that the information reading from the non-contact IC chip succeeded, as described above, the control unit 108 controls to execute the image formation on the relevant paper (step S907). Then, the image-formed paper is discharged to the predetermined tray (step S908).

Meanwhile, if the information reading failed, the control unit 108 stops the image formation on the paper (step S911). That is, the toner image (that is, the toner itself) formed on the photosensitive drum 211 is collected by the cleaner 222, and the paper is then transported to the location between the photosensitive drum 211 and the transfer unit 215 by the registration rollers 223. Thus, the paper passes the fixing unit 216 in the state that any toner image is not transferred to the relevant paper. Here, since the paper has been already inverted (step S912), it is controlled by the control unit 108 to transport the paper to the finisher 220. Then, for example, the control unit 108 controls the finisher 220 so as to discharge the paper to the tray designated as the faulty IC chip paper discharge destination tray by using the faulty IC chip paper discharge destination tray selection screen as shown in FIG. 7 (step S914). Here, it should be noted that the paper on which the information writing to the non-contact IC chip failed might include the ordinary paper.

Subsequently, the flow returns to the step S903 to feed a new paper. Then, the control unit 108 controls to again form the same image on the newly fed paper, and this is repeated until the information reading from the non-contact IC chip on the paper succeeds.

As above, according to the present embodiment, if the information reading from the non-contact IC chip fails with respect to the one face of the paper, the relevant paper is inverted, and the information reading from the non-contact IC chip is again executed with respect to the other face of the relevant paper. Therefore, it is possible to reduce the occurrence of the papers on which the information reading from the non-contact IC chip failed. In particular, if the directional non-contact IC chips are added to both the faces of the paper, the present embodiment is effective for the relevant paper.

In the present embodiment, the principle of the present invention is applied to the double-sided copying. However, the principle of the present invention can be also applied to the single-sided copying as in the first embodiment. In any case, when the principle of the present invention is applied to the single-sided copying, if the information reading from the non-contact IC chip cannot be executed, the image formation is not executed, and the relevant paper is discharged to the faulty IC chip paper discharge destination tray set through the screen shown in FIG. 7.

In the present embodiment, the information reading from the non-contact IC chip is explained. However, even in the case where the information is written to the non-contact IC chip, if the information writing fails, it is possible to invert the paper and again execute the information writing to the non-contact IC chip on the inverted paper. In that case, if the information writing fails after the image formation in the single-sided copying, the information writing to the non-contact IC chip is executed without executing the image formation after the inversion of the paper. Moreover, in the case where the information writing succeeded on the back face of the paper succeeded, if the paper is discharged as it is, the relevant paper is discharged in the inversion state that the front and back faces of the relevant paper are opposed to those of other image-formed papers. For this reason, the paper on which the image formation was executed to its back face is inverted and then discharged.

In the above first, second and third embodiments, it is controlled whether or not to execute the image formation according to whether or not the information writing or reading with respect to the non-contact IC chip succeeded. However, instead, it is also possible to adopt the constitution of changing the destination to which the image-formed paper (that is, the paper on which the image formation has ended) should be discharged, according to whether or not the information writing or reading with respect to the non-contact IC chip succeeded. That is, in such a case, the image formation is executed to the fed paper irrespective of whether or not the information writing or reading with respect to the non-contact IC chip succeeded. Then, the paper discharge destination tray is changed or switched so that, from among the image-formed papers, the papers on which the information writing or reading with respect to the non-contact IC chip succeeded and the papers on which the information writing or reading with respect to the non-contact IC chip failed are discharged respectively to the different trays. Moreover, in that case, if the information writing with respect to the non-contact IC chip failed, the message indicating such a fact may be synthesized as an additional image to the image to be essentially formed. For example, as such messages, "THERE IS A POSSIBILITY THAT NON-CONTACT IC ADDED TO THIS PAPER HAS BEEN DAMAGED", "WRITING OF INFORMATION TO NON-CONTACT IC ADDED TO THIS PAPER FAILED", and the like can be supposed. Incidentally, it should be noted that the above additional image is previously stored in the ROM 108c or the hard disk 107 in the digital copying machine 101.

Further, in the above first, second and third embodiments, the case where the principle of the present invention is applied to the operation in the copy mode is explained. However, it is also possible to apply the principle of the present invention to the case where the image received through the facsimile, the image received through the network I/F unit 106, the image stored in the hard disk 107 and the like are output by the printer unit 104.

Furthermore, in the above first, second and third embodiments, the reader unit 103 and the printer unit 104 are controlled by the control unit 108. Instead, the reader unit 103 and the printer unit 104 may be controlled respectively from the PC 110 through the LAN 112.

Moreover, in the above first, second and third embodiments, the operations are indicated from the touch panel 316 of the operation unit 102. However, it is also possible to indicate the operations by the access from the PC 110.

Moreover, in each of the above embodiments, the laser beam printer is explained as the printer unit (or the printer engine) by way of example. Instead, it is also possible to use the printer having the print system other than the laser beam system. More specifically, it is possible to use the printers of an electrophotographic system (for example, an LED system), a liquid crystal shutter system, an inkjet system, a thermal transfer system, a sublimation system, and the like.

Moreover, the principle of the present invention is likewise applicable to a facsimile machine, a printer device and the like.

Incidentally, it is needless to say that the object of the present invention is achieved in a case where the storage medium (or the recording medium) storing (or recording) therein the program codes of software to realize the functions of the above embodiments is supplied to a system or an apparatus, and thus the computer (or CPU, MPU) in the system or the apparatus reads and executes the program codes stored in the storage medium. In that case, the program codes themselves read out of the storage medium realize the functions of the above embodiments, whereby the storage medium storing these program codes constitutes the present invention.

As the storage medium from which the program codes are supplied, for example, a Floppy™ disk, a hard disk, a magnetooptical disk, a CD-ROM, a CD-R, a CD-RW, a DVD-ROM, a DVD-RAM, a DVD-RW, a DVD+RW, a magnetic tape, a nonvolatile memory card, a ROM, or the like can be used. In addition, the program codes may be downloaded through the network.

Further, the present invention includes not only a case where the functions of the above embodiments are realized by executing the program codes read by the computer, but also a case where the OS (operating system) or the like running on the computer executes a part or all of the actual processes based on the indications of the program codes and thus the functions of the above embodiments are realized by the relevant processes.

Furthermore, the present invention also includes the case where, after the program codes read out of the storage medium are written into the memory provided on function expansion board inserted in the computer or in the function expansion unit connected to the computer, the CPU or the like provided on the function expansion board or in the function expansion unit executes a part or all of the actual processes on the basis of the instructions of the program codes, and thus the functions of the above embodiments are realized by the relevant processes.

As described above, while the present invention has been described with reference to what is presently considered to be the preferred embodiment, it is to be understood that the present invention is not limited to the disclosed embodiment. On the contrary, the present invention is intended to cover various modifications and equivalent arrangements included within the spirit and scope of the appended claims.

This application claims priority from Japanese Patent Application No. 2004-299074 filed on Oct. 13, 2004, which is hereby incorporated by reference herein.

The invention claimed is:

1. An image forming device comprising:
    an image forming unit adapted to form an image on a fed recording medium;
    a re-feeding unit adapted to re-feed the recording medium on which the image has been formed by the image forming unit, to the image forming unit;
    a writing unit adapted to be able to execute at least information writing in a non-contact manner to a non-contact IC chip added to the recording medium fed to the image forming unit; and
    a control unit adapted to execute control to cause, in a case where the information writing to the non-contact IC chip by the writing unit was correctly executed, the image forming unit to execute the image formation to the recording medium to which the non-contact IC chip has been added, and to execute control to cause, in a case where the information writing to the non-contact IC chip by the writing unit was not correctly executed, the re-feeding unit to re-feed the recording medium to the image forming unit and to cause the writing unit to again execute the information writing to the IC chip added to the recording medium re-fed by the re-feeding unit.

2. An image forming device according to claim 1, wherein
    the writing unit executes the information writing to the non-contact IC chip added to the recording medium re-fed by the re-feeding unit, and
    the control unit executes control to cause the image forming unit to execute the image formation on the recording medium in the case where the information writing by the writing unit to the non-contact IC chip added to the re-fed recording medium was correctly executed, and not to execute the image formation on the recording medium in the case where the information writing by the writing unit to the non-contact IC chip added to the re-fed recording medium was not correctly executed.

3. An image forming device according to claim 1, wherein, in the case where the information writing by the writing unit to the non-contact IC chip added to the re-fed recording medium was not correctly executed, the control unit discharges the recording medium to a discharge destination different from a discharge destination for the recording medium on which the image has been formed by the image forming unit.

4. A control method for an image forming device which comprises an image forming unit to form an image on a fed recording medium, and a re-feeding unit to re-feed the recording medium on which the image has been formed by the image forming unit, to the image forming unit, the method comprising:
- a writing step of executing at least information writing in a non-contact manner to a non-contact IC chip added to the recording medium; and
- a control step of executing control to cause, in a case where the information writing to the non-contact IC chip was correctly executed in the writing step, the image forming unit to execute the image formation to the recording medium to which the non-contact IC chip has been added, and of executing control to cause, in a case where the information writing to the non-contact IC chip was not correctly executed in the writing step, the re-feeding unit to re-feed the recording medium to the image forming unit and to cause in the writing step to again execute the information writing to the IC chip added to the recording medium on which the image has been formed by the image forming unit and which was re-fed by the refeeding unit.

5. A non-transitory computer-readable storage medium which stores therein a control program for causing an image forming device to execute a control method for the image forming device which comprises an image forming unit to form an image on a fed recording medium, and a re-feeding unit to re-feed the recording medium to the image forming unit, the control method comprising:
- a writing step of executing at least information writing in a non-contact manner to a non-contact IC chip added to the recording medium; and
- a control step of executing control to cause, in a case where the information writing to the non-contact IC chip was correctly executed in the writing step, the image forming unit to execute the image formation to the recording medium to which the non-contact IC chip has been added, and of executing control to cause, in a case where the information writing to the non-contact IC chip was not correctly executed in the writing step, the re-feeding unit to re-feed the recording medium to the image forming unit and to cause in the writing step to again execute the information writing to the IC chip added to the recording medium on which the image has been formed by the image forming unit and which was re-fed by the re-feeding unit.

* * * * *